H. C. BURK,

*MECHANICAL MOVEMENT,*

72972.

PATENTED
JAN 7 1868

Witnesses
P. T. Dodge
Jno. Johnson

Inventor
H. C. Burk
by Dodge & Munn
his attys

United States Patent Office.

H. C. BURK, OF MINERAL POINT OHIO.

Letters Patent No. 72,972, dated January 7, 1868.

IMPROVEMENT IN MECHANICAL MOVEMENT.

*The Schedule referred to in these Letters Patent and making part of the same.*

TO ALL WHOM IT MAY CONCERN:

Be it known that I, H. C. BURK, of Mineral Point, in the county of Tuscarawas, and State of Ohio, have invented certain new and useful Improvements in Mechanical Movements; and I do hereby declare that the following is a full, clear, and exact description thereof, reference being had to the accompanying drawings, making part of this specification, and to the letters of reference marked thereon, like letters indicating like parts wherer they occur.

To enable others skilled in the art to construct and use my invention, I will proceed to describe it.

My invention relates to mechanical movements, and consists of a novel arrangement of mechanism for transmitting motion from or near the circumference of a driving-wheel to another wheel turning upon the same shaft and centre, so as to give it an increased velocity of revolution over that of the driving-wheel, as well as for converting rotatory into reciprocal motion at the same time by the use of a pitman. In the drawings—

Figure 1:
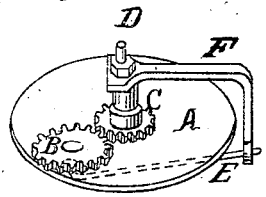
Figure 1 is a perspective view.
Figure 2:
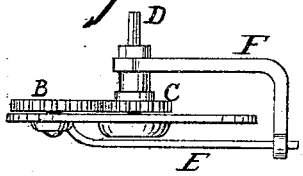
Figure 2 is an edge or side view.

In constructing my mechanical movement, I use a wheel, A, driven by animal, water, wind, steam, or other power, as in reaping or mowing-machines, horse-powers, water-wheels, windmills, steam-engines, &c. Near the periphery of the wheel A, I place the spur-wheel B, attached rigidily to a shaft which passes through the wheel A, so as to turn in it, and which has connected with it, on the side of the wheel A opposite the spur-wheel B, a pitman-rod, E, which moves easily upon it. The spur-wheel B gears into the pinion-wheel C, which turns loosely on the shaft D of the wheel A, as shown in fig. 1. On the shaft D, I place the arm F, so as to move loosely about it, and bent, as shown in figs. 1 and 2, provided at its outer end with a hole through which the pitman E passes loosely.

In operating my mechanical movement, it will be seen that as the wheel A turns, it carries with it the spur-wheel B, which causes the pinion-wheel C to revolve, and that every revolution of the wheel A, will, through the spur-wheel B, cause the pinion-wheel C to make more than double the number of revolutions of the wheel A, and at the same time gives a reciprocating movement to the pitman E.

By means of my mechanical movement, I am thus enabled to give great rapidity of motion to the pinion-wheel C, with an economical use of my power. Motion may be communicated from the pinion-wheel C and the pitman E to other mechanism as and when desired.

Having thus described my invention, what I claim, is—

The combination of the main wheel A, spur-wheel B, with its pitman E and pinion-wheel C, all arranged to operate substantially as and for the purpose set forth.

H. C. BURK.

Witnesses:
H. B. MUNN,
P. T. DODGE.